United States Patent [19]
Gornowicz

[11] Patent Number: 6,015,858
[45] Date of Patent: Jan. 18, 2000

[54] THERMOPLASTIC SILICONE ELASTOMERS BASED ON FLUOROCARBON RESIN

[75] Inventor: Gerald Alphonse Gornowicz, Midland, Mich.

[73] Assignee: Dow Corning Corporation, Midland, Mich.

[21] Appl. No.: 09/149,267

[22] Filed: Sep. 8, 1998

[51] Int. Cl.[7] ............................ C08L 47/00; C08L 27/12; C08L 51/08; C08L 83/04; C08L 43/04
[52] U.S. Cl. ............................ 524/545; 524/413; 525/104
[58] Field of Search ................................ 524/413, 545; 525/104

[56] References Cited

U.S. PATENT DOCUMENTS

| | | | |
|---|---|---|---|
| Re. 33,070 | 9/1989 | Arkles | 525/431 |
| 3,627,836 | 12/1971 | Getson | 260/825 |
| 3,865,897 | 2/1975 | Falender et al. | 260/827 |
| 3,969,308 | 7/1976 | Penneck | 260/37 SB |
| 4,695,602 | 9/1987 | Crosby et al. | 524/439 |
| 4,714,739 | 12/1987 | Arkles | 525/92 |
| 4,775,712 | 10/1988 | Sasaki et al. | 524/504 |
| 4,803,244 | 2/1989 | Umpleby | 525/105 |
| 4,831,071 | 5/1989 | Ward et al. | 524/401 |
| 4,849,469 | 7/1989 | Crosby et al. | 524/439 |
| 4,888,390 | 12/1989 | Liang et al. | 525/189 |
| 4,970,263 | 11/1990 | Arkles et al. | 525/92 |
| 5,051,478 | 9/1991 | Puydak et al. | 525/195 |
| 5,391,594 | 2/1995 | Romenesko et al. | 523/212 |
| 5,395,886 | 3/1995 | Caporiccio et al. | 525/102 |
| 5,480,930 | 1/1996 | Gentle et al. | 524/414 |
| 5,556,908 | 9/1996 | Chung et al. | 524/493 |
| 5,604,288 | 2/1997 | Furukawa et al. | 524/493 |
| 5,648,426 | 7/1997 | Zolotnitsky | 524/100 |

FOREIGN PATENT DOCUMENTS

| | | | |
|---|---|---|---|
| 410888 | 1/1991 | European Pat. Off. | C08K 5/00 |
| 0 506 465 A2 | 9/1992 | European Pat. Off. | C08L 67/02 |
| 0 651 009 A1 | 5/1995 | European Pat. Off. | C08L 21/00 |
| 56-5852 | 1/1981 | Japan . | |
| 62-11897 | 1/1987 | Japan . | |
| 62121752 | 6/1987 | Japan | C08L 51/08 |
| 63-219147 | 9/1988 | Japan . | |
| 3-115450 | 5/1991 | Japan | C08L 27/06 |
| 5-59287 | 3/1993 | Japan | C08L 101/00 |
| 7-26147 | 1/1995 | Japan | C08L 83/07 |
| 08337698 | 12/1996 | Japan . | |
| WO 96/01291 | 1/1996 | WIPO | C08L 21/00 |

*Primary Examiner*—Robert Dawson
*Assistant Examiner*—Jeffry B. Robertson
*Attorney, Agent, or Firm*—Alex Weitz

[57] ABSTRACT

There is disclosed a method for preparing a thermoplastic elastomer composition which exhibits improved mechanical properties, said method comprising:

(I) reacting
 (A) a fluorocarbon resin with
 (B) a grafting agent, in the presence of
 (C) a radical initiator,
to prepare a modified fluorocarbon resin;
(II) mixing said modified fluorocarbon resin with
 (D) a silicone base consisting essentially of a diorganopolysiloxane gum having an average of at least 2 alkenyl radicals in its molecule and a reinforcing filler,
 (E) an organohydrido silicon compound which contains an average of at least 2 silicon-bonded hydrogen groups in its molecule, and
 (F) a hydrosilation catalyst,
components (E) and (F) being present in an amount sufficient to cure said diorganopolysiloxane; and
dynamically curing said diorganopolysiloxane.

22 Claims, 4 Drawing Sheets

THERMOPLASTIC SILICONE ELASTOMERS BASED ON FLUOROCARBON RESIN

FIELD OF THE INVENTION

The present invention relates to thermoplastic elastomer compositions wherein a silicone base is dispersed in a thermoplastic fluorocarbon resin and dynamically vulcanized therein.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (thermoplastic silicone vulcanizate or TPSiV). In such a material, the elastomeric component can be cured by various mechanisms, but it has been shown that the use of a non-specific catalyst, such as an organic peroxide, can also result in at least a partial cure of the thermoplastic resin itself, thereby reducing or completely destroying ability to re-process the composition (i.e., it no longer is a thermoplastic elastomer). In other cases, the peroxide can lead to the partial degradation of the thermoplastic resin. To address these problems, elastomer-specific crosslinkers, such as organohydrido silicon compounds, can be used to cure alkenyl-functional elastomers.

Arkles, in U.S. Pat. No. 4,500,688, discloses semi-interpenetrating networks (IPN) wherein a vinyl-containing silicone fluid having a viscosity of 500 to 100,000 cS is dispersed in a conventional thermoplastic resin. Furthermore, Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. This disclosure states that the chain extension procedure results in a thermoplastic composition when the vinyl-containing silicone has 2 to 4 vinyl groups and the hydride-containing silicone has 1 to 2 times the equivalent of the vinyl functionality. On the other hand, silicones which predominantly undergo crosslinking reaction result in thermoset compositions when the vinyl-containing silicone has 2 to 30 vinyl groups and the hydride-containing silicone has 2 to 10 times the equivalent of the vinyl functionality. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions.

In WO 96/01291 to Advanced Elastomer Systems, thermoplastic elastomers having improved resistance to oil and compression set are disclosed. These systems are prepared by first forming a cured rubber concentrate wherein a curable elastomeric copolymer is dispersed in a polymeric carrier not miscible therewith, the curable copolymer being dynamically vulcanized while this combination is mixed. The resulting rubber concentrate is, in turn, blended with an engineering thermoplastic to provide the desired TPE. Silicone rubber is disclosed as a possible elastomeric component, but no examples utilizing such a silicone are provided. Further, this publication specifically teaches that the polymeric carrier must not react with the cure agent for the curable copolymer.

Although the above publications disclose the preparation of thermoplastic elastomer compositions using various thermoplastic resins as the matrix and a dispersed silicone elastomer phase which is dynamically vulcanized therein, neither these publications, nor any art known to applicant, teach the specific additional components and methods required to prepare a satisfactory TPSiV wherein the matrix is a fluorocarbon (FC) resin. For example, a copending application to Gornowicz et al. entitled "Thermoplastic Silicone Elastomers" ((Ser. No. 034,089, filed Mar. 23, 1998) teaches the preparation of TPSiVs based on polyolefin or poly(butylene teraphthalate) resins wherein silicone gum is dispersed the organic resin and subsequently dynamically vulcanized therein via a hydrosilation cure system. Under certain conditions, such systems were shown to have significantly improved mechanical properties over the corresponding simple blends of resin and silicone gum in which the gum was not cured. However, attempts to prepare a similar TPSiV based on an FC resin have proved unsuccessful and properties of the dynamically vulcanized system were comparable to those of the corresponding simple blend.

SUMMARY OF THE INVENTION

It has now been discovered that TPSiVs having excellent mechanical properties can be prepared from an FC resin according to the methods described by Gornowicz et al., cited supra, only when the resin is first modified by reacting it with a grafting agent in the presence of a radical initiator. These compositions generally exhibit tensile strengths and/ or elongations which are significantly higher than the respective values for corresponding systems wherein the FC resin has not been so modified as well as these properties for the corresponding simple blends.

The present invention, therefore, relates to a method for preparing a thermoplastic elastomer, said method comprising:

(I) reacting
  (A) a fluorocarbon resin with
  (B) a grafting agent, in the presence of
  (C) a radical initiator,
to prepare a modified fluorocarbon resin;
(II) mixing said modified fluorocarbon resin with
  (D) a silicone base comprising a diorganopolysiloxane gum having an average of at least 2 alkenyl radicals in its molecule and a reinforcing filler,
  (E) an organohydrido silicon compound which contains an average of at least 2 silicon-bonded hydrogen groups in its molecule, and
  (F) a hydrosilation catalyst,
components (E) and (F) being present in an amount sufficient to cure said diorganopolysiloxane; and
(III) dynamically curing said diorganopolysiloxane,
wherein the amount of said silicone base (D) used is such that at least one property of the thermoplastic elastomer selected from tensile strength or elongation is at least 25% greater than the respective property for a corresponding composition wherein said FC resin is not modified, with the proviso that said thermoplastic elastomer has an elongation of at least 25%.

The invention further relates to the thermoplastic elastomers obtained by the above described method.

DETAILED DESCRIPTION OF THE INVENTION

Component (A) of the present invention is a fluorocarbon (FC) resin having a melt point ($T_m$) or glass transition temperature ($T_g$) above room temperature (RT) and below 300° C. For the purposes of the present invention, the FC resin is a polymer or copolymer prepared from at least one monomer having a carbon-bonded hydrogen. Thus, it is contemplated that the FC resin may be a poly(vinylidene difluoride) homopolymer (PVDF) or copolymers of vinylidene difluoride or vinyl fluoride with one or more fluoroolefins, such as chlorotrifluoroethylene, tetrafluoroethylene (TFE), hexafluoropropene (HFP) or a perfluoroalkylvinylether, such as perfluoromethylvinyl ether. It can also be a copolymer of chlorotrifluoroethylene (CTFE) with ethylene, a copolymer of TFE with ethylene or a copolymer of hexafluoropropene with ethylene. However, the FC resin can not be a polymer or copolymer which can not be modified by reaction with the grafting agent in the presence of the radical initiator, as described infra. Thus, for example, a homopolymer of TFE or CTFE or a copolymer of TFE and HFP are unsuitable for use as component (A).

According to the method of the present invention, the FC resin is first modified by reacting it with a grafting agent (B) in the presence of a radical initiator. Grafting agent (B) is selected from the group consisting of (B') organic (i.e., non-silicone) compounds which contain 2 or more olefin groups, (B") low molecular weight organopolysiloxanes containing at least 2 olefin groups and (B'") olefin-functional silanes which also contain at least one hydrolyzable group or at least one hydroxyl group attached to a silicon atom thereof. Terminally unsaturated olefinic groups are preferred. However, the grafting agent must not poison the dynamic cure of the diorganopolysiloxane component, described infra. For example, diallylphosphine or diallyl sulfide could be grafted to the FC resin but would poison the catalyst.

Organic grafting agent (B') can be illustrated by compounds such as diallyphthalate, triallyl isocyanurate, 2,4,6-triallyloxy-1,3,5-triazine, triallyl trimesate, 1,5-hexadiene, 1,7-octadiene, 2,2'-diallylbisphenol A, N,N'-diallyl tartardiamide, diallylurea, diallyl succinate and divinyl sulfone, inter alia.

Grafting agent (B") may be selected from low molecular weight linear, branched or cyclic organopolysiloxanes having a viscosity less than about 5,000 mPa-s, and having at least 2 alkenyl groups in the molecule. Examples of such siloxanes include divinyltetramethyldisiloxane, cyclotrimethyltrivinyltrisiloxane, cyclotetramethyltetravinyltetrasiloxane, hydroxy endblocked polymethylvinylsiloxane, hydroxy terminated polymethylvinylsiloxane-co-polydimethylsiloxane, dimethylvinylsiloxy terminated polydimethylsiloxane, tetrakis (dimethylvinylsiloxy)silane and tris(dimethylvinylsiloxy) phenylsilane. When the viscosity of (B") is much greater than about 5,000 mPa-s, little or no improvement of the resulting TPSiV is observed with respect to a similar system wherein the FC resin is not modified as well as with respect to a simple blend wherein the diorganopolysiloxane gum is not dynamically vulcanized. Preferably, the organopolysiloxane has a viscosity of less than 1,000 mPa-s at 25° C., most preferably less than 100 mPa-s.

Grafting agent (B'") is a silane which contains at least one alkylene group, preferably comprising vinylic unsaturation, as well as at least one silicon-bonded moiety selected from hydrolyzable groups or a hydroxyl group. Suitable hydrolyzable groups include alkoxy, aryloxy, acyloxy or amido groups. Examples of such silanes are vinyltriethoxysilane, vinyltrimethoxysilane, hexenyltriethoxysilane, hexenyltrimethoxy, methylvinyldisilanol, octenyltriethoxysilane, vinyltriacetoxysilane, vinyltris(2-ethoxyethoxy)silane, methylvinylbis(N-methylacetamido) silane, methylvinyldisilanol.

Other than the limitations noted above, the structure of the grafting agent is not critical. It is most preferred that this component is a multi-functional alkenyl, such as (MeViSiO)$_3$, triallyl isocyanurate or an oligomeric organopolysiloxane containing Me and Vi, wherein Me and Vi hereinafter denote methyl and vinyl groups, respectively.

The amount of grafting agent used per 100 parts of FC resin is determined by routine experimentation so as to obtain at least the above stated 25% improvement in tensile and/or elongation of the resulting TPSiV over the corresponding composition wherein the FC resin is not modified.

Preferably, 0.05 to 5 parts by weight and most preferably 0.1 to 2 parts of the grafting agent is used for each 100 parts of FC resin. The resulting modified FC resin is not crosslinked and, although it is a solid under normal ambient conditions, it flows upon the application of a shearing stress when heated above its melt point (i.e., melt flow).

Radical initiator (C) is any organic compound which can generate free radicals at elevated temperatures. The initiator is not specifically limited and may be any of the known azo or diazo compounds, such as 2,2'-azobisisobutyronitrile, but it is preferably selected from organic peroxides such as hydroperoxides, diacyl peroxides, ketone peroxides, peroxyesters, dialkyl peroxides, peroxydicarbonates, peroxyketals, peroxy acids, acyl alkylsulfonyl peroxides and alkyl monoperoxydicarbonates. A key requirement, however, is that the half life of the initiator (C) be short enough so as to promote reaction of grafting agent (B) with the FC resin within the time and temperature constraints of the reaction step (I). For example, in a batch mixer the half life could be about a minute, but in a twin screw extruder the half life could be of the order of several seconds. The modification temperature, in turn, depends upon the type of FC resin and is preferably as low as practical consistent with uniform mixing of components (A) through (C). Typically, this temperature is 5–50° C. above the melting point of the FC resin. Specific examples of suitable peroxides which may be used according to the method of the present invention include benzoyl peroxide, dicumyl peroxide, t-butyl peroxy O-toluate, cyclic peroxyketal, t-butyl hydroperoxide, t-butyl peroxypivalate, lauroyl peroxide and t-amyl peroxy 2-ethylhexanoate, di-t-butyl peroxide, 1,3-bis(t-butylperoxyisopropyl) benzene, 2,2,4-trimethylpentyl-2-hydroperoxide, 2,5-bis(t-butylperoxy)-2,5-dimethylhexyne-3, t-butylperoxy-3,5,5-trimethylhexanoate, cumene hydroperoxide, t-butyl peroxybenzoate and diisopropylbenzene mono hydroperoxide, inter alia. It is preferred that component (C) is dicumyl peroxide. Less than 1 part by weight of peroxide per 100 parts of FC is generally used. Preferably, 0.05 to 0.5 parts, and most preferably 0.1 to 0.3 parts, are so employed.

Base (D) is a uniform blend comprising (D') a diorganopolysiloxane gum which contains at least 2 alkenyl radicals having 2 to 20 carbon atoms in its molecule and (D") a reinforcing filler. The alkenyl group on the gum is specifically exemplified by vinyl, allyl, butenyl, pentenyl, hexenyl and decenyl, preferably vinyl or hexenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.0001 to 3 mole percent, preferably 0.0005 to 1 mole percent, in the diorganopolysiloxane. The remaining (i.e., non-alkenyl) silicon-bonded organic groups of the diorganopolysiloxane are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; and halogenated alkyl groups having 1 to 20 carbon atoms, such as 3,3,3-trifluoropropyl and chloromethyl. It will be understood, or course, that these groups are selected such that the diorganopolysiloxane has a glass temperature (or melt point) which is below room temperature and the cured polymer is therefore elastomeric. Methyl preferably makes up at least 85, more preferably at least 90 mole percent, of the non-alkenyl silicon-bonded organic groups in the diorganopolysiloxane.

Thus, polydiorganosiloxane (D') can be a homopolymer, a copolymer or a terpolymer containing such organic groups. Examples include copolymers comprising dimethylsiloxy units and phenylmethylsiloxy units, copolymers of dimethylsiloxy units and diphenylsiloxy units and interpolymers of dimethylsiloxy units, diphenylsiloxy units and phenylmethylsiloxy units, among others. The molecular structure is also not critical and is exemplified by straight-chain and partially branched straight-chain structures, the linear systems being preferred.

Specific illustrations of diorganopolysiloxane (D') include:

trimethylsiloxy-endblocked dimethylsiloxane-methylvinylsiloxane copolymers;
trimethylsiloxy-endblocked methylphenylsiloxane-dimethylsiloxane-methylvinylsiloxane copolymers;
dimethylvinylsiloxy-endblocked dimethylpolysiloxanes;
dimethylvinylsiloxy-endblocked dimethylsiloxane-methylvinylsiloxane copolymers;
dimethylvinylsiloxy-endblocked methylphenylpolysiloxanes;
dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

The gum may also consist of combinations of two or more organopolysiloxanes. Most preferably, diorganopolysiloxane (D') is a linear polydimethylsiloxane homopolymer and is preferably terminated with a vinyl group at each end of its molecule or it is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. Although there is no absolute upper limit on the plasticity of component (B), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (D") is any filler which is known to reinforce diorganopolysiloxane (D') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 450 m$^2$/gram. A fumed silica having a surface area of 50 to 400 m$^2$/g, most preferably 200 to 380 m$^2$/g, is highly preferred. The filler is added at a level of about 5 to about 200 parts by weight, preferably 10 to 150 and most preferably 15 to 100 parts by weight, for each 100 parts by weight of diorganopolysiloxane (D').

The fumed silica filler is preferably treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10, and it is used at a level of about 5 to 50 parts by weight for each 100 parts by weight of the silica filler. When the diorganopolysiloxane is the preferred vinyl-functional or hexenyl-functional polydimethylsiloxane, this treating agent is preferably a hydroxy-terminated polydimethylsiloxane.

The organohydrido silicon compound (E) is a crosslinker (cure agent) for diorganopolysiloxane (D') and is an organopolysiloxane which contains at least 2 silicon-bonded hydrogen atoms in each molecule which are reacted with the alkenyl functionality of (D') during the dynamic curing step (III) of the present method. A further (molecular weight) limitation is that Component (E) must have at least about 0.2 weigh percent hydrogen, preferably 0.2 to 2 and most preferably 0.5 to 1.7, percent hydrogen bonded to silicon. Those skilled in the art will, of course, appreciate that either the diorganopolysiloxane (D') or component (E), or both, must have a functionality greater than 2 to cure the diorganopolysiloxane (i.e., the sum of these functionalities must be greater than 4 on average). The position of the silicon-bonded hydrogen in component (E) is not critical, and it may be bonded at the molecular chain terminals, in non-terminal positions along the molecular chain or at both positions. The silicon-bonded organic groups of component (E) are independently selected from any of the saturated hydrocarbon or halogenated hydrocarbon groups described above in connection with diorganopolysiloxane (D'), including preferred embodiments thereof. The molecular structure of component (E) is also not critical and is exemplified by straight-chain, partially branched straight-chain, branched, cyclic and network structures, linear polymers or copolymers being preferred. It will, of course, be recognized that this component must be compatible with D' (i.e., it is effective in curing the diorganopolysiloxane).

Component (E) is exemplified by the following:
low molecular weight siloxanes such as PhSi(OSiMe$_2$H)$_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units,
wherein Ph hereinafter denotes phenyl radical.

Particularly preferred organohydrido silicon compounds are polymers or copolymers comprising RHSiO units terminated with either $R_3SiO_{1/2}$ or $HR_2SiO_{1/2}$ units wherein R is independently selected from alkyl radicals having 1 to 20 carbon atoms, phenyl or trifluoropropyl, preferably methyl. It is also preferred that the viscosity of component (E) is about 0.5 to 1,000 mPa-s at 25° C., preferably 2 to 500 mPa-s. Component (E) preferably has 0.5 to 1.7 weight percent hydrogen bonded to silicon. It is highly preferred that component (E) is selected from a polymer consisting essentially of methylhydridosiloxane units or a copolymer consisting essentially of dimethylsiloxane units and methylhydridosiloxane units, having 0.5 to 1.7 weight percent hydrogen bonded to silicon and having a viscosity of 2 to 500 mPa-s at 25° C. Such a highly preferred system has terminal groups selected from trimethylsiloxy or dimethylhdridosiloxy groups. Component (E) may also be a combination of two or more of the above described systems.

The organohydrido silicon compound (E) is used at a level sufficient to cure diorganopolysiloxane (D') in the presence of catalyst (F), described infra. Typically, its content is adjusted such that the molar ratio of SiH therein to Si-alkenyl in (D') is greater than 1. Preferably, this SiH/alkenyl ratio is below about 50, more preferably 3 to 20 and most preferably 6 to 12. These SiH-functional materials are well known in the art and many are commercially available.

Hydrosilation catalyst (F) is a catalyst that accelerates the cure of the diorganopolysiloxane in the present composition. It is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (F) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al., these patents being hereby incorporated by reference. Most preferably, catalyst (F) is a neutralized complex of platinous chloride and divinyltetramethyldisiloxane.

Component (F) is added to the present composition in a catalytic quantity sufficient to promote the reaction between diorganopolysiloxane (D') and component (E) so as to cure the diorganopolysiloxane. For the purposes of the invention, the cured diorganopolysiloxane is essentially insoluble in a good solvent for the corresponding uncured gum (i.e., the crosslinked gum is a gel). Confirmation of cure can be carried out by extracting the finished TPSiV at elevated temperatures using a solvent such as xylene and determining the amount of diorganopolysiloxane leached out of the composition. The gel content of the silicone fraction should be greater than 80%, preferably greater than 90%. Typically, the catalyst is typically added so as to provide about 0.1 to 500 parts per million (ppm) of metal atoms based on the total weight of the thermoplastic elastomer composition, preferably 0.25 to 50 ppm.

In addition to the above mentioned major components (A) thought (F), a minor amount (i.e., less than 50 weight percent of the total composition) of one or more optional additive (G) can be incorporated in the TPSiV compositions of the present invention. This optional additive can be illustrated by the following non-limiting examples: extending fillers such as quartz, calcium carbonate, and diatomaceous earth; pigments such as iron oxide and titanium oxide; electrically conducting fillers such as carbon black and finely divided metals; heat stabilizers such as hydrated cerric oxide, calcium hydroxide, magnesium oxide; and flame retardants such as halogenated hydrocarbons, alumina trihydrate, magnesium hydroxide, organophosphorous compounds and other fire retardant (FR) materials. These additives are typically added to the final TPSiV composition after dynamic cure, but they may also be added at any point in the preparation provided they do not interfere with the dynamic vulcanization mechanism. A preferred optional ingredient is a polytetrafluoroethylene powder which has been observed to improve the mechanical properties of the TPSiVs when included at a level of about 0.2 to 5 parts by weight for each 100 parts by weight of silicone rubber base.

According to the method of the present invention, the thermoplastic elastomer is preferably prepared by thoroughly dispersing base (D) in a modified FC resin and then dynamically vulcanizing the diorganopolysiloxane of the base using organohydrido silicon compound (E) and catalyst (F). Mixing is carried out in any device which is capable of uniformly dispersing the components in the resin, such as an internal mixer or a twin-screw extruder, the latter being preferred for commercial preparations. As previously noted, the FC resin must be modified before adding components (D) through (F). After modification of the FC resin, the order of mixing components (D) through (F) is not critical. Typically (G) would be added after (F) but it is not critical as long as (G) does not interfere with cure of the elastomer phase (e.g., (G) can be premixed with the FC resin or with the base).

In a preferred mixing procedure, the FC resin (A) and grafting agent (B) are first melted in an internal mixer at a controlled temperature above the melt point of the resin and radical initiator (C) is added. The temperature used during this resin modification step is experimentally determined so as to impart an optimum half life for the initiator (C). During this step, component (C) must be thoroughly mixed into the FC resin/grafting agent combination as it concurrently decomposes to a sufficient extent to graft the agent to the resin in the time allotted. If the temperature is too high, the initiator decomposes prematurely and modification of the resin is inefficient; if the temperature is too low, not enough initiator decomposes and little modification of the FC resin results. It is preferred to thoroughly mix the grafting agent with the FC resin before adding the radical initiator.

Modification of the FC resin can be accomplished in one step, just prior to addition of base (D), crosslinker (E) and catalyst (F). Alternatively, the thermoplastic elastomer can be prepared in two steps, modifying the FC resin first, removing it from the mixer then in a subsequent step adding the modified FC resin back to the mixer with base (D), crosslinker (E) and catalyst (F).

As noted above, in order to be within the scope of the present invention, the tensile strength or elongation, or both, of the TPSiVs must be at least 25% greater than the corresponding property of a similar dynamically cured system in which the FC resin has not been modified. A further requirement of the invention is that the resulting TPSiV has an elongation of at least 25%. In order to determine if a particular composition meets the above criteria, the tensile strength of the TPSiV is measured on dumbbells having a length of 25.4 mm and a width of 3.2 mm and a typical thickness of 1 to 2 mm, according to ASTM method D 412, at an extension rate of 50 mm/min. Three such samples are evaluated and the one having the maximum tensile reading is selected for comparison of tensile and elongation values. These values are then compared to the corresponding values for a similar dynamically cured composition wherein the FC resin was not reacted with the grafting agent in the presence of the radical initiator.

It has been observed that when the level of the silicone component is too high that weak, non-homogeneous and difficult to process materials are obtained. And these materials do not show a 25% improvement in tensile and/or elongation over the corresponding unmodified resin TPSiV. Although the range of diorganopolysiloxane consistent with the above recited tensile/elongation requirement depends upon the particular thermoplastic resin and other components selected, it is preferred to use about 40% to 95%, more preferably 50% to 90%, of FC resin (A) based on the total weight of components (A) through (F). However, the upper limit of silicone content is generally determined by processability considerations since too high a level results in at least a partially crosslinked composition. This limit is the highest level of components (D) which allows the TPSiV to be readily processed by conventional plastic operations such as molding and extrusion. A thermoplastic elastomer of the present invention which is subsequently re-processed in this manner generally exhibits approximately the same mechanical properties as the virgin TPSiV formulation.

A thermoplastic elastomer of the present invention can be processed by conventional techniques, such as extrusion, vacuum forming, injection molding, blow molding or compression molding, to fabricate plastic parts. Moreover, these compositions can be re-processed (recycled) with little or no degradation of mechanical properties. These novel thermoplastic elastomers find utility in the fabrication of wire and cable insulation, such as plenum wire, automotive and appliance components, belts, hoses, construction seals and in general rubber applications.

EXAMPLES

The following examples are presented to further illustrate the compositions and method of this invention, but are not to be construed as limiting the invention, which is delineated in the appended claims. All parts and percentages in the examples are on a weight basis and all measurements were obtained at 25° C.

Materials

The following materials, listed alphabetically for ease of reference, were employed in the examples.

AGENT 1 is an hydroxy end-blocked methylvinylsiloxane oligomer having a viscosity of about 35 mPa-s and containing 30% —CH=CH$_2$ groups and 3% OH groups.

AGENT 2 is vinyl triethoxysilane.

AGENT 3 is triallyl isocyanurate.

AGENT 4 is divinyltetramethyldisiloxane.

AGENT 5 is a HO(Me$_2$)Si- end-blocked methylvinylsiloxane-dimethylsiloxane co-oligomer having about 10% vinyl groups and 8% hydroxyl groups.

AGENT 6 is similar to AGENT 5 wherein the terminal SiOH groups are replaced with SiH.

AGENT 7 is diallyl o-phthalate.

AGENT 8 is trimethyltrivinylcyclotrisiloxane.

AGENT 9 is dimethylvinylsilyl end-blocked polydimethylsiloxane containing 1.2% vinyl groups.

AGENT 10 is a methylvinylsiloxane-dimethylsiloxane copolymer having a viscosity of about 16,000 mPa-s and a vinyl content of 8%.

BASE 1 is a silicone rubber base made from 68.7% PDMS 1, defined infra, 25.8% of a fumed silica having a surface area of about 250 $m^2/g$, 5.4% of a hydroxy-terminated diorganopolysiloxane having an average degree of polymerization (DP) of about 4 and 0.02% of ammonium carbonate.

BASE 2 is silicone rubber powder consisting of 4% of a hydroxy-terminated polydimethylsiloxane fluid having an average degree of polymerization (DP) of about 4, 51.3% of PDMS 1, 4% of $CH_2$=CHC(O)O$(CH_2)_3SiO_{3/2}$ and 38.6% of SILICA, described infra, and 2.0% of a resin consisting essentially of $(CH_3)SiO_{3/2}$, $(CH_3)_2 SiO_{2/2}$, $CH_3ViSiO_{2/2}$, $PhSiO_{3/2}$ and $(CH_3)_3SiO_{1/2}$ units in a molar ratio of 16:61:41:8:1, respectively, in which Vi denotes a vinyl radical. This powder was prepared according to the methods described in U.S. Pat. No. 5,391,594 to Romenesko et al., hereby incorporated by reference.

BASE 3 is a silicone rubber base made from 77% PDMS 1, defined infra, 17% of a fumed silica having a surface area of about 250 $m^2/g$, 6% of a hydroxy-terminated diorganopolysiloxane having an average degree of polymerization (DP) of about 4 and 0.02% of ammonium carbonate.

CATALYST is a 1.5% platinum complex of 1,3-diethenyl-1,1,3,3-tetramethyldisiloxane; 5.0% tetramethyldivinyldisiloxane; 93% dimethylvinyl-ended polydimethylsiloxane and 0.5% dimethylcyclopolysiloxanes having 6 or greater dimethylsiloxane units, made according to the patent to Brown et al., cited supra.

FC 1 is a copolymer of vinylidene fluoride (VDF) marketed by Solvay S. A., Brussels, as Solef™ 31508/0009.

FC 2 is a copolymer of VDF marketed by Solvay S. A., Brussels, as Solef™ 31508/0003.

FC 3 is a homopolymer of VDF marketed by Elf Atochem as Kynar Flex™ 721.

FC 4 is copolymer of vinylidene fluoride and hexafluoropropene having a melt point of 135–140° C. sold by Aldrich, Milwaukee, Wis.

FC 5 is an alternating copolymer of ethylene and chlorotrifluoroethylene having a melt point of 224° C. and a melt index of 15–20 g/10 min (275° C./2.16 kg, ASTM D 1238) sold by Aldrich, Milwaukee, Wis.

PDMS 1 is a gum having a plasticity of about 150 and consisting of 99.6 wt % $Me_2SiO$ units, 0.16% MeViSiO units and 0.17% $Me_2ViSiO_{1/2}$ units; prepared by potassium catalyzed equilibration of cyclic siloxanes wherein the catalyst is neutralized with carbon dioxide.

PDMS 2 is a gum similar to PDMS 1 having a plasticity of about 150 wherein the catalyst is neutralized with both carbon dioxide and a silyl phosphate.

PEROXIDE is dicumyl peroxide catalyst, Di-Cup® R marketed by Hercules, Wilmington, Del.

PEROXIDE 1 is cumene hydroperoxide sold by Aldrich, Milwaukee, Wis.

PTFE is a polytetrafluoroethylene powder, TEFLON® 6C, marketed by E. I. DuPont, Wilmington, Del.

SILICA is a fumed silica filler having a surface area of about 250 $m^2/g$ and marketed under the trade name of Cab-O-Sil® MS-75 by Cabot Corp., Tuscola, Ill.

X-LINKER 1 is an SiH-functional crosslinker consisting essentially of 65.6% MeHSiO units, 32.3% $Me_2SiO$ units and 1.8% $Me_3SiO_{1/2}$ units.

X-LINKER 2 is an SiH-functional crosslinker consisting essentially of 36.4% MeHSiO units, 23.6% $Me_2SiO$ units and 15% $Me_3SiO_{1/2}$ units.

X-LINKER 3 is an SiH-functional crosslinker consisting essentially of a liquid trimethylsiloxy-terminated polymethylhydrogensiloxane having a silicon-bonded hydrogen content of about 1.6%.

X-LINKER 4 is an SiH-functional crosslinker prepared by silylating 30 mole % of 1-octene with the above described X-LINKER 3 using $H_2PtCl_6$ as catalyst to provide a product having silicon-bonded hydrogen content of about 1.1%.

Sample Preparation

Preparation of thermoplastic silicone elastomers (TPSiVs) of the invention, as well as comparative examples, was carried out in a 60 ml Haake™ internal mixer equipped with sigma blades at the indicated times and temperatures. In a typical procedure, the FC resin was added to the pre-heated mixer and melted for about 2 to 10 minutes. Then treating agent and PEROXIDE were added and mixed for 2 to 10 minutes, whereupon the silicone base was added and mixed for 2 to 10 min. Finally, crosslinker and catalyst were added and mixing was continued to allow dynamic vulcanization of the silicone component, generally at a blade speed of about 50 to 100 rpm.

After a thermoplastic elastomer was prepared according to the above procedure, the composition was compression molded for about 5–10 minutes at the indicated temperature and allowed to cool under pressure to provide slabs having a thickness of about 1 to 2 mm. These slabs were stored at room temperature for at least 16 hours and were then cut into dumbbells using an ASTM (American Society for Testing Materials) die having a test length of 25.4 mm and test width of 3.2 mm. Three such samples were tested by a method similar to ASTM D 412 using a Sintech™ machine (MTS Systems, Corp., Research Triangle Park, N.C.) at a test speed of 50 mm/min. Nominal tensile strength (i.e., based on the initial cross-sectional area) and elongation at break was reported for the sample having the greatest tensile value. In some cases, the modulus at 50% elongation was also calculated.

Durometer was determined using a Shore D test instrument (Shore Instrument & Mfg., New York, N.Y.).

(Comparative) Example I

Figure 1:
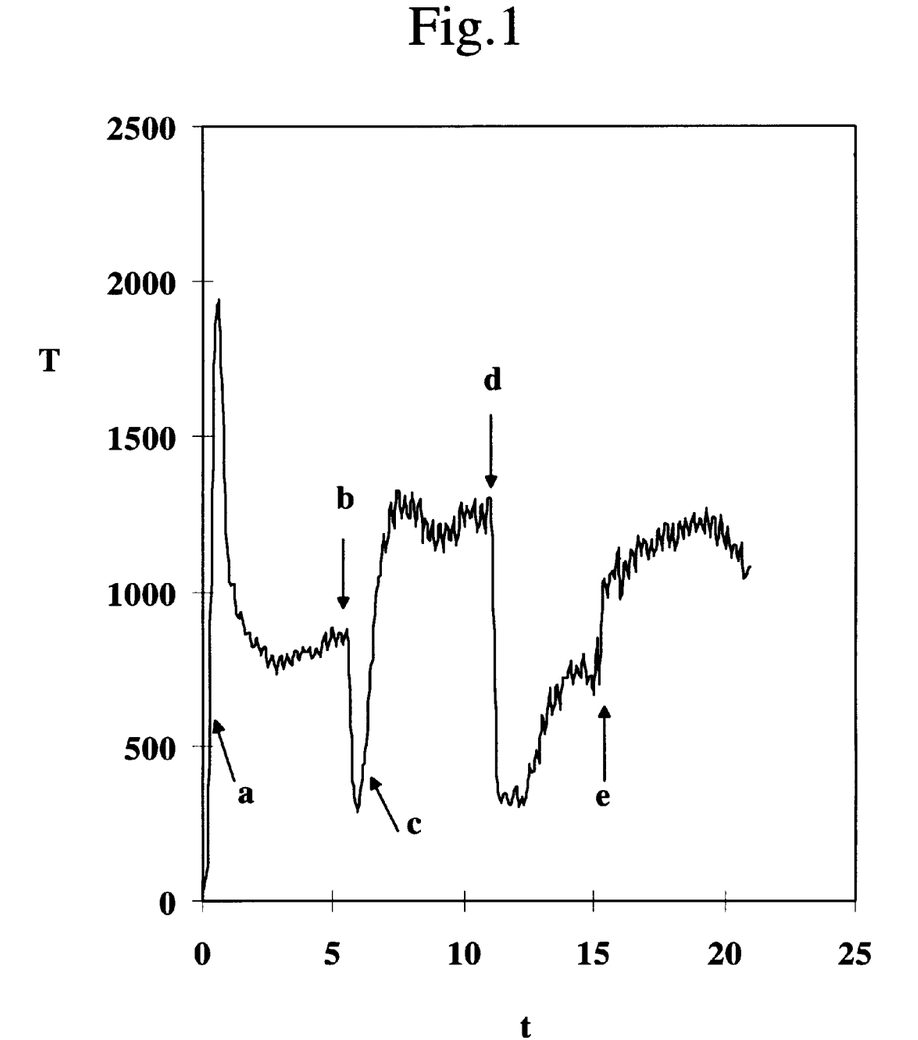
FIG. 1 is a plot of torque (T) versus time (t) during mixing of a fluorocarbon (FC) resin with a grafting agent and a peroxide initiator followed by addition of a crosslinker and platinum catalyst.

The reactivity of a modified FC resin with respect to the silicone cure system was determined in a similar mixing procedure and at the same temperature as used to prepare the TPSiVs of the invention. For such an operation, mixing torque (T) (m-g) was plotted against time (t) (min) and the addition points of each component indicated by a letter, as shown in FIG. 1. In this figure, FC 1 (80.0 g) was added to the mixer at 180° C. at 100 rpm, point (a). The mixture was cooled to keep the melt temperature at 175–185° C., and, after 5.5 min, AGENT 1 (0.4 g) and PEROXIDE (0.1 g) were added at points (b) and (c), respectively. After an additional 5.5 min, X-LINKER 1 (0.7 g) was added, point (d). After another 4 min, the torque had regained equilibrium and CATALYST (0.07 g) was added, point (e). The torque immediately increased from 750 m-g to over 1000 m-g, indicating reaction between the modified resin and X-LINKER 1.

(Comparative) Example II

Figure 2:
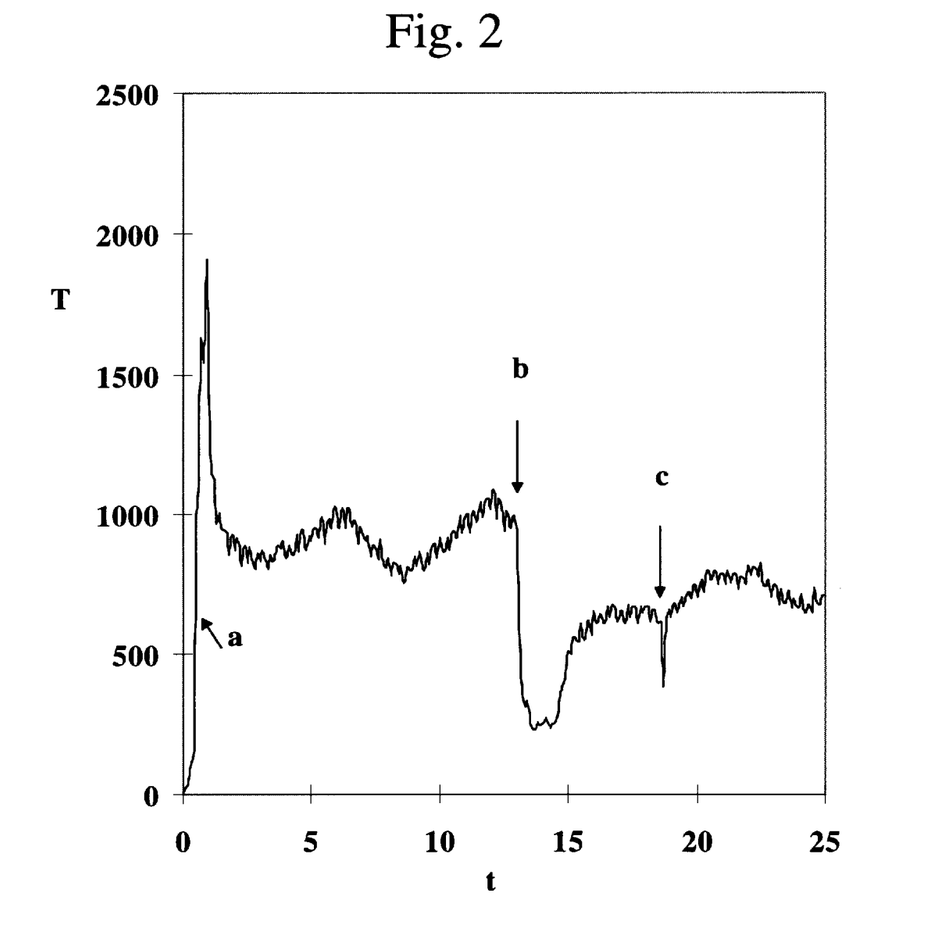
FIG. 2 is a similar plot wherein the FC resin is mixed only with crosslinker and catalyst.

FIG. 2 shows that there is no interaction of unmodified FC 1 with the silicone cure system. In FIG. 2, addition and melting of FC 1 (79.5 g) is shown at point (a) at 175° C. Mixing was continued for about 12 min at a temperature of 175–185° C. to establish a baseline for the torque. X-LINKER 1 (1.2 g) was added slowly to keep FC 1 from sticking to the mixing blades, point (b). The torque dropped and then partially recovered due to the lubricating nature of X-LINKER 1. CATALYST (0.07 g) was added at point (c). There was essentially no increase in torque when CATALYST was added, evidence that there was no reaction between the unmodified resin and X-LINKER 1.

(Comparative) Example III

A simple blend of FC 1 and BASE 2 (i.e., wherein the silicone was not cured) was prepared by adding FC 1 (56.0 g) to the mixer at 180° C. After mixing for 10 min, BASE 2 (23.5 g) was added and mixing continued for another 10 min. This simple blend was molded and found to have an ultimate tensile strength of 6.5 MPa and ultimate elongation of 162%.

(Comparative) Example IV

Figure 3:
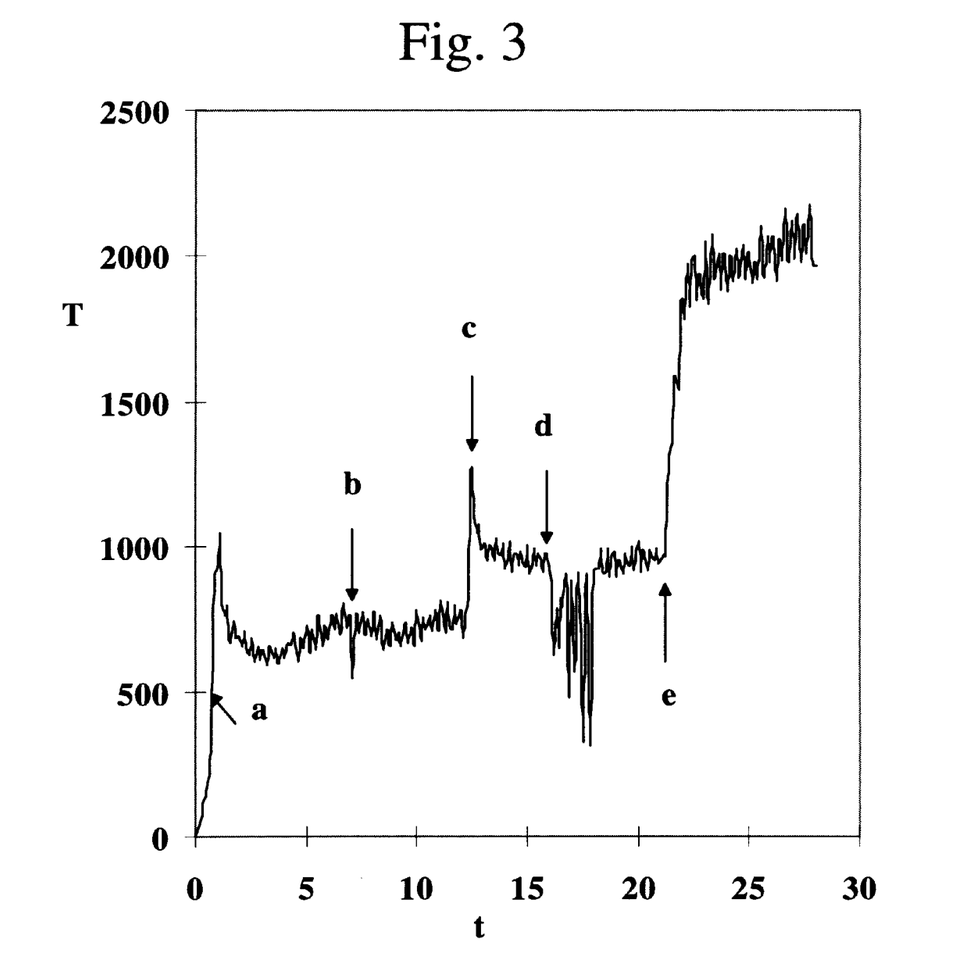
FIG. 3 is a similar plot showing the mixing of an unmodified FC resin with silicone base and subsequent dynamic vulcanization of the silicone.

The same composition according to (Comparative) Example III was dynamically vulcanized as follows. FIG. 3, is a T-t plot for the preparation of a dynamic blend after treating the FC resin with peroxide, but no grafting agent. In FIG. 3, FC 1 (56 g) was added and melted at 175° C. and 100 rpm in the mixer, point (a), the temperature being kept at 175–185° C. At point (b), PEROXIDE (0.1 g) was added about 6 min. After mixing 5 min, BASE 2 (23.5 g) was added at point (c). After 4 min, X-LINKER 1 (1.2 g) was added at point (d). After 4 min, CATALYST (0.07 g) was added at point (e) and the torque increased from 1000 m-g to 2000 m-g. The product was mixed for 6 min, removed from the mixer and compression molded. Properties are reported in Table 1, from which it is seen that this composition showed a comparable ultimate tensile strength but significantly less elongation than the formulation of (Comparative) Example III.

Example 1

Figure 4:
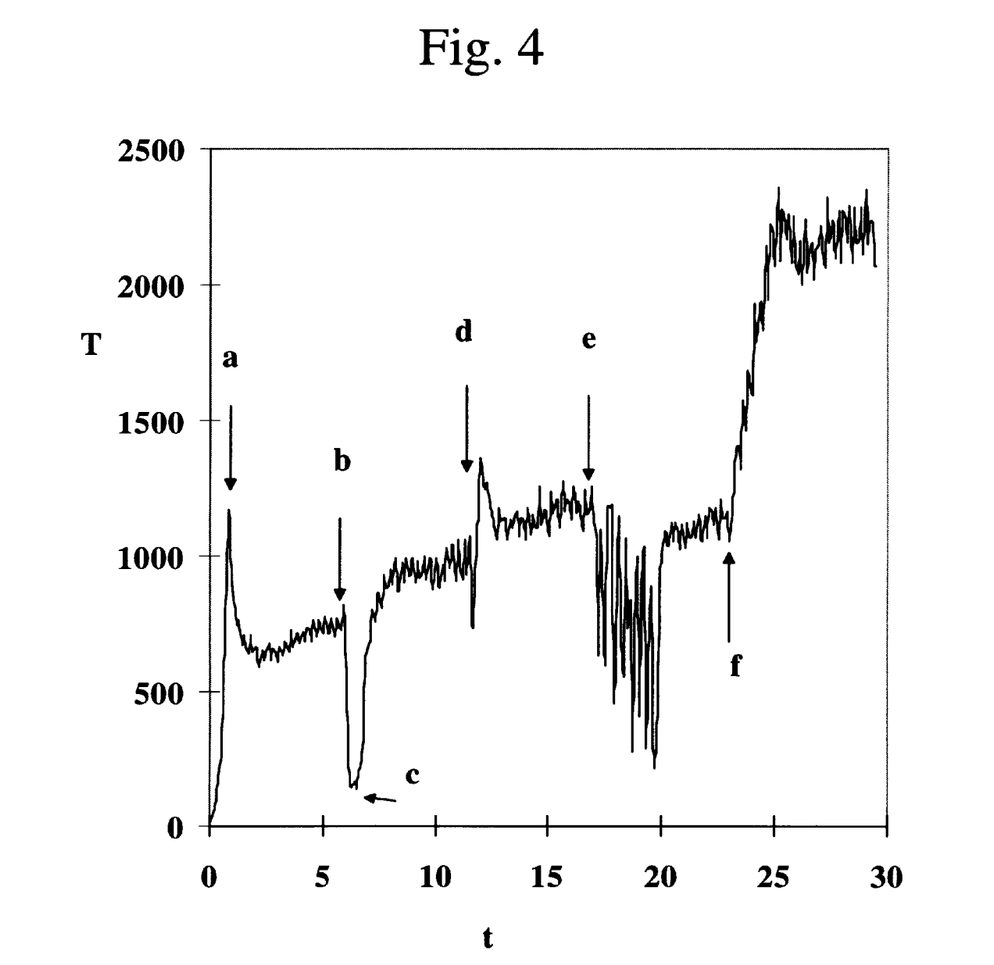
FIG. 4 is a similar plot wherein a modified FC resin is mixed with a silicone base and the silicone is dynamically vulcanized.

A T-t plot for a TPSiV of the invention is shown in FIG. 4. In this example, FC 1 (56.0 g) was added to the mixer at 175° C., point (a). After 6 min., AGENT 1 (0.4 g) and PEROXIDE (0.1 g) were added at points (b) and (c), respectively. The material was mixed 4 min and BASE 2 (23.5 g) was added, point (d). After mixing another 6 min, X-LINKER 1 (1.2 g) was added slowly, point (e). After 5 more min, CATALYST (0.07 g) was added, point (f) and the torque immediately increased from 1000 m-g to about 2200 m-g. The product was mixed 6 min, removed from the mixer and compression molded to give ultimate tensile 15.6 MPa, ultimate elongation 348%.

As previously discussed, the treatment of the FC resin should be carried out at an optimum temperature for the particular peroxide used so as to react the grafting agent with the resin. For Dicup™, this optimum temperature is about 175–185° C.

(Comparative) Example V

FC 1 (56 g) was mixed with AGENT 1 (0.6 g) for 4 min and PEROXIDE (0.1 g) was added at 180° C. After 2 min, a masterbatch of PDMS 2 (22.2 g) and PTFE (1.3 g) was added. This was mixed for 3 min and X-LINKER 1 (1.2 g) was added. After 5 min, CATALYST (0.07 g) was added. The torque increased from about 800 m-g to 2250 m-g. After 14 min, a hard material covered with small, rubbery spheres was removed from the mixer. The compression molded sample was not homogeneous and was not tested.

Example 2

FC 2 (56 g) was added to the mixer at 175–180° C. After 4 min, AGENT 2 (0.8 g) was mixed for 2 min and then PEROXIDE (0.14 g) was added. After 2 min, a masterbatch of BASE 3 (24 g) and PTFE (0.5 g) was added. This was mixed for about 2 min and X-LINKER 1 (1.2 g) was added slowly. After 5 min, CATALYST (0.07 g) was added. The torque increased from about 1800 to 2200 m-g. The product was uniform and had a Shore D durometer of 38, an ultimate tensile of 8.7 MPa, ultimate elongation of 138% and a 50% modulus of 7.5 MPa.

Examples 3–8

The above mixing procedures were followed for the compositions shown in Table 1, wherein mechanical properties of each formulation is also reported. In this table, similar compositions wherein the FC resin was not reacted with a grafting agent are also illustrated (Comparative Examples). For the samples marked by an asterisk in Table 1, FC 1 resin was modified with AGENT 1 and PEROXIDE and the necessary weight of the modified FC 1 was then used to make the blend. Examples 6 and 7 show that comparable properties are obtained whether the blend is made in one step (Example 7) or two steps (Example 6). In Example 6, FC 1 resin (80 g) was put in the mixer at 175° C. and melted. AGENT 1 (0.6 g) was added over 4 min and PEROXIDE (0.1 g) was added at 180 to 185° C. The material was mixed at this temperature for 4 min after adding the peroxide. A 40 g aliquot of this modified FC 1 was put back in the mixer and melted at 175° C. BASE 2 (40 g) was added. After mixing for 4 min, X-LINKER 1 (0.8 g) was added and mixed for 2 min. CATALYST (0.06 g) was added and the torque increased from 1200 to 2700 m-g. A sample of the material was molded, tested the results are given in Table 1. From Table 1 it is seen that a modified FC formulation wherein the BASE 2:FC 1 ratio is at least 70/30, does not have an elongation of at least 25% and, therefore, is outside the scope of the present invention.

TABLE 1

|  | Comp. Ex. VI | Ex. 3 | Comp. Ex. VII | Ex. 4 | Comp. Ex. IV | Ex. 5 |
|---|---|---|---|---|---|---|
| Composition |  |  |  |  |  |  |
| FC 1 | 90 | 90 | 80 | 80 | 70 | 70 |
| PEROXIDE | 0 | 0.12 | 0 | 0.11 | 0.12 | 0.12 |
| AGENT 1 | 0 | 0.7 | 0 | 0.6 | 0 | 0.5 |
| BASE 2 | 10 | 10 | 20 | 20 | 30 | 30 |
| X-LINKER 1 | 0.6 | 0.5 | 1.1 | 1.0 | 1.5 | 1.5 |
| CATALYST | 0.09 | 0.09 | 0.09 | 0.09 | 0.09 | 0.09 |
| Properties |  |  |  |  |  |  |
| Durometer, D | 48 | 50 | 42 | 45 | 45 | 45 |
| Tensile, MPa | 12.2 | 20.9 | 7.9 | 18.4 | 7.3 | 15.6 |
| Elongation, % | 183 | 469 | 72 | 360 | 96 | 342 |
| 50% Modulus, Mpa | 10.7 | 13.0 | 7.7 | 11.6 | 6.8 | 8.1 |

|  | Comp. Ex. VIII | Ex. 6* | Ex. 7 | Comp. Ex. IX | Ex. 8* | Comp. Ex. X | Comp. Ex. XI* |
|---|---|---|---|---|---|---|---|
| Composition |  |  |  |  |  |  |  |
| FC 1 | 50 | 50 | 50 | 40 | 40 | 30 | 30 |
| BASE 2 | 50 | 50 | 50 | 60 | 60 | 70 | 70 |
| X-LINKER 1 | 1.8 | 1.0 | 1.7 | 1.5 | 1.5 | 1.6 | 1.6 |
| CATALYST | 0.09 | 0.08 | 0.09 | 0.09 | 0.09 | 0.09 | 0.08 |
| PEROXIDE | 0 | 0.07 | 0.12 | 0 | 0.05 | 0 | 0.03 |
| AGENT 1 | 0 | 0.33 | 1.1 | 0 | 0.3 | 0 | 0.23 |

TABLE 1-continued

| Properties | | | | | | | |
|---|---|---|---|---|---|---|---|
| Durometer, D | 24 | 38 | 36 | 34 | 35 | 31 | 29 |
| Tensile, MPa | 5.2 | 10.0 | 8.5 | 3.4 | 5.3 | 0.6 | 1.7 |
| Elongation, % | 25 | 122 | 122 | 21 | 50 | 3 | 12 |
| 50% Modulus, Mpa | — | 7.0 | 5.8 | — | 5.3 | — | — |

*Prepared by a two-step procedure

Examples 9–11

Table 2 shows the effect of varying the temperature during modification of the FC on properties of 70/30 blends of FC 1 with BASE 1. FC 1 (70 parts) was heated to the indicated temperature for the grafting reaction using Sigma blades at 100 rpm. AGENT 2 (0.8 part) and PEROXIDE (0.12 part) were added at the temperatures specified in Table 2. Then a masterbatch of BASE 1 (30 parts) and PTFE (0.5 part) was added and mixed. The silicone base was cured with X-LINKER 1 (1.5 parts) and CATALYST (0.09 part).

TABLE 2

| | Example 9 | Example 10 | Example 11 |
|---|---|---|---|
| Modification Temp. (° C.) | 165 | 185 | 200 |
| Properties | | | |
| Durometer, D | 39 | 42 | 39 |
| Tensile, MPa | 10.7 | 14.0 | 7.5 |
| Elongation, % | 224 | 330 | 120 |

Examples 12–14

TPSiVs of the invention were prepared at 175–185° C. at different mixing speeds using Sigma blades for the following formulation: FC 1 (70 parts); AGENT 1 (0.6 part); PEROXIDE (0.12 part); BASE 2 (30 parts); X-LINKER 1 (1.7 parts) and CATALYST (0.09 part). Results are reported in Table 3 below:

TABLE 3

| | Example 12 | Example 13 | Example 14 |
|---|---|---|---|
| Blade Speed (rpm) | 100 | 75 | 50 |
| Properties | | | |
| Durometer, D | 48 | 48 | 48 |
| Tensile, MPa | 16.1 | 17.6 | 16.4 |
| Elongation, % | 233 | 312 | 256 |
| 50% Modulus, Mpa | 10.3 | 10.0 | 9.9 |

Examples 15–16

The following examples illustrate the optimization of grafting agent content in a 70/30 FC 1/BASE 2 formulation prepared at 175–185° C. The amount of AGENT 1 used per 70 parts of FC 1 resin is indicated in Table 4. The other components were as follows: PEROXIDE (0.12 part), BASE 2 (30 parts), X-LINKER 1 (1.5 parts) and CATALYST (0.09 part). Results are reported in Table 4.

TABLE 4

| | Example 15 | Example 5 | Example 16 |
|---|---|---|---|
| Parts of AGENT 1 | 1.0 | 0.5 | 0.2 |
| Properties | | | |
| Durometer, D | 47 | 45 | 44 |
| Tensile, MPa | 14.4 | 15.6 | 13.5 |
| Elongation, % | 242 | 342 | 254 |

Examples 17–23

The above procedures were used to prepare TPSiVs using a variety of grafting agents in 70/30 FC 1/BASE 2 formulations, the results being presented in Table 5. These were prepared as described in Example 1 at 175–185° C. using Sigma blades at 100 rpm and with the following components: 70 parts of FC 1; 0.5 to 1.0 part of grafting agent, as indicated in Table 5; 0.12 part of PEROXIDE; 30 parts of BASE 2; 1.5 parts of X-LINKER 1 and 0.09 part of CATALYST.

TABLE 5

| Grafting Agent | Parts of Graft Agent | Tensile (MPa) | Elongation (%) | Example |
|---|---|---|---|---|
| None | 0 | 7.3 | 96 | (Comp.) Ex. IV |
| AGENT 1 | 0.5 | 15.6 | 342 | 17 |
| AGENT 3 | 0.5 | 15.2 | 282 | 18 |
| AGENT 4 | 1.0 | 12.2 | 270 | 19 |
| AGENT 5 | 0.5 | 14.0 | 184 | 20 |
| AGENT 6 | 0.5 | 10.6 | 162 | 21 |
| AGENT 7 | 0.5 | 9.3 | 142 | 22 |
| AGENT 8 | 0.75 | 17.4 | 330 | 23 |

After aging at room temperature for three weeks, Example 23 was remolded and tested again to give an ultimate tensile of 16.7 MPa, ultimate elongation 320%, showing little change in properties after remolding. Transmission electron microscopy of Example 23 showed dispersed silicone particles having a typical size of less than 1 micron versus 10–50 microns for a comparable TPSiV wherein the FC resin was not modified.

Examples 24–29

Materials shown in Table 6 were prepared as in Example 1 at 175–185° C. using Sigma blades at 100 rpm and the following formulation: 50 parts of FC 1; 50 parts of BASE 2; 0.12 part of PEROXIDE; 0.5 to 1.1 parts of grafting agent, as indicated in Table 6; 1.8 parts of X-LINKER 1 and 0.09 part of CATALYST.

TABLE 6

| Grafting Agent | Parts of Graft Agent | Tensile (MPa) | Elongation (%) | Example |
|---|---|---|---|---|
| None* | 0 | 5.2 | 25 | Comp VIII |
| AGENT 1 | 1.1 | 8.5 | 122 | 7 |
| AGENT 2 | 0.5 | 8.6 | 152 | 24 |
| AGENT 4 | 1.1 | 10.3 | 186 | 25 |
| AGENT 5 | 0.5 | 10.1 | 148 | 26 |
| AGENT 6 | 0.5 | 7.0 | 98 | 27 |
| AGENT 8 | 1.1 | 8.5 | 68 | 28 |
| AGENT 9 | 0.5 | 7.4 | 94 | 29 |

*no peroxide added (Comparative) Example XII

FC 1 (56 g) was melted at 180° C. in the mixer at 100 rpm. After 7 min, AGENT 10 (0.8 g) was added followed immediately by PEROXIDE (0.1 g). The material was mixed for 8 min and BASE 2 (23.5 g) was added. After mixing for 8 min, X-LINKER 1 (1.2 g) was added and mixed for 4 min. CATALYST (0.07 g) was added and the torque increased from about 800 m-g to 2,000 m-g. The material was further mixed for 5 min and compression molded to give an ultimate tensile strength of 7.7 Mpa and elongation of 94%, little improvement over (Comparative) Example III where no modifying agent was used. This example illustrates that an organopolysiloxane having a viscosity of more than 5,000 mPa-s (i.e., AGENT 10) is not a suitable component (B").

Example 30–32

The above procedures were used to prepare 70/30 FC 1/BASE 2 formulations employing different cross-linkers, the results being presented in Table 7.

TABLE 7

|  | Ex. 5 | Ex. 30 | Ex. 31 | Ex. 32 |
|---|---|---|---|---|
| Composition |  |  |  |  |
| FC 1 | 70 | 70 | 70 | 70 |
| BASE 2 | 30 | 30 | 30 | 30 |
| X-LINKER 1 | 1.5 | 0 | 0 | 0 |
| X-LINKER 2 | 0 | 1.5 | 0 | 0 |
| X-LINKER 3 | 0 | 0 | 1.5 | 0 |
| X-LINKER 4 | 0 | 0 | 0 | 1.5 |
| CATALYST | 0.09 | 0.09 | 0.09 | 0.09 |
| PEROXIDE | 0.12 | 0.12 | 0.12 | 0.12 |
| AGENT 1 | 0.5 | 0.75 | 0.75 | 0.75 |
| Properties |  |  |  |  |
| Durometer, D | 45 | 45 | 45 | 45 |
| Tensile (MPa) | 15.6 | 15.8 | 16.3 | 15.3 |
| Elongation (%) | 342 | 267 | 250 | 251 |
| 50% Modulus (MPa) | 8.1 | 9.7 | 10.5 | 9.6 |

Examples 33–34

The above procedures were repeated to prepare TPSiVs base on FC 3 resin. FC 3 (70 parts) was heated at 175° C. AGENT 1 (0.5 part) was added. After 2 min, PEROXIDE (0.12 part) was added and the torque increased from 600 m-g to 1,000 m-g. The material was mixed for 5 min and BASE 2 (30 parts) was added. After 5 min X-LINKER 1 (1.6 parts) was added and mixed 5 min. CATALYST (0.05 part) was added and the torque increased from 1600 to 1900 m-g. The material was mixed 4 min then removed from the mixer hot and compression molded (Example 33). A similar procedure resulted in the composition of Example 34, the properties of these being reported in Table 8, along with comparative systems wherein the FC 3 was not modified.

TABLE 8

|  | Comparative Ex. XIII | Example 33 | Comparative Ex. XIV | Example 34 |
|---|---|---|---|---|
| Composition |  |  |  |  |
| FC 3 | 70 | 70 | 50 | 50 |
| BASE 2 | 30 | 30 | 50 | 50 |
| X-LINKER 1 | 1.6 | 1.6 | 1.6 | 1.4 |
| CATALYST | 0.09 | 0.05 | 0.09 | 0.08 |
| PEROXIDE | 0 | 0.12 | 0 | 0.11 |
| AGENT 1 | 0 | 0.5 | 0 | 0.4 |

TABLE 8-continued

|  | Comparative Ex. XIII | Example 33 | Comparative Ex. XIV | Example 34 |
|---|---|---|---|---|
| Properties |  |  |  |  |
| Durometer, D | 63 | 65 | 52 | 53 |
| Tensile (MPa) | 17.4 | 25.0 | 7.5 | 13.7 |
| Elongation (%) | 40 | 119 | 17 | 65 |

Examples 35–39

The above procedures were repeated to prepare TPSiV based on FC 2. Example 37 being illustrative of this series. FC 2 (50 parts) was heated at 175° C. After 5 min, AGENT 2 (0.5 part) was added immediately followed by addition of PEROXIDE (0.12 part). The torque increased from about 500 m-g to 600 m-g. The material was mixed for 10 min and a masterbatch of BASE 1 (50 parts) with PTFE (1.1 parts) was added. After 12 min X-LINKER 1 (1.5 parts) was added and mixed about 5 min. CATALYST (0.1 pt) was added and the torque increased from 1200 to 2500 m-g. The material was mixed for 6 minutes, removed while hot and compression molded. The properties of this and similarly prepared formulations are reported in Table 9.

In this series, Example 39 was prepared by a two step procedure as follows. FC 2 (80 g) was modified with AGENT 2 (0.8 g) and PEROXIDE (0.26 g) at 175–185° C. A masterbatch of BASE 1 (65 g) and PTFE (1.5 g) was prepared at 50–80° C. Thirty grams 30 g of the modified FC 2 was mixed with 45 g of this masterbatch. The silicone base was then vulcanized with 1.2 g of X-LINKER 1 and 0.07 g of CATALYST.

TABLE 9

|  | Comp Ex. XV | Example 35 | Comp. Ex. XVI | Example 36 |
|---|---|---|---|---|
| Composition |  |  |  |  |
| FC 2 | 70 | 70 | 60 | 60 |
| BASE 1 | 30 | 30 | 40 | 40 |
| PTFE | 0.7 | 0.7 | 0.9 | 0.9 |
| AGENT 2 | 0 | 0.75 | 0 | 0.6 |
| PEROXIDE | 0.12 | 0.12 | 0.17 | 0.12 |
| X-LINKER 1 | 1.5 | 1.5 | 1.6 | 1.6 |
| CATALYST | 0.09 | 0.09 | 0.09 | 0.09 |
| Properties |  |  |  |  |
| Durometer, D | 37 | 40 | 32 | 35 |
| Tensile (MPa) | 7.0 | 10.0 | 6.0 | 8.1 |
| Elongation (%) | 69 | 202 | 51 | 138 |

|  | Comp. Ex. XVII | Example 37 | Example 38 | Example 39* | Comp. Ex. XVIII |
|---|---|---|---|---|---|
| Composition |  |  |  |  |  |
| FC 2 | 50 | 50 | 50 | 40 | 40 |
| BASE 1 | 50 | 50 | 50 | 60 | 60 |
| PTFE | 1.1 | 1.1 | 0 | 1.4 | 1.4 |
| AGENT 2 | 0 | 0.5 | 0.5 | 0.4 | 0 |
| PEROXIDE | 0.12 | 0.12 | 0.12 | 0.13 | 0.14 |
| X-LINKER 1 | 1.5 | 1.5 | 1.4 | 1.6 | 1.7 |
| CATALYST | 0.1 | 0.1 | 0.09 | 0.09 | 0.09 |
| Properties |  |  |  |  |  |
| Durometer, D | 30 | 33 | 33 | 23 | 24 |
| Tensile (MPa) | 4.2 | 7.9 | 5.0 | 5.7 | 3.3 |
| Elongation (%) | 50 | 162 | 96 | 139 | 60 |

*Prepared by a two-step procedure

Example 40

The above procedures were followed wherein FC 4 (70 parts) was mixed with AGENT 1 (0.75 part) at 175–185° C.

and PEROXIDE (0.12 part) was then added. After 2 min, BASE 1 (30 parts) was added and mixed for 7 min and X-LINKER 1 (1.4 parts) was added. After another 5 min, CATALYST (0.19 part) was added and the material was mixed for 7 more min. The resulting TPSiV had an ultimate tensile strength of 19.1 MPa and elongation of 280% versus an ultimate tensile strength of 12.7 MPa and elongation of 256% for a corresponding TPSiV made from unmodified FC 4.

Example 41

A masterbatch of BASE 1 (65 g) and PTFE (1.5 g) was prepared in the mixer, the torque increasing from 1100 to 1700 m-g when the PTFE was added. FC 1 (37 g) was modified with AGENT 2 (0.4 g) and PEROXIDE (0.1 g) at 175–185° C. and 37 g of the above described masterbatch of BASE 1/PTFE was introduced and mixed for 5 min. The silicone component was then vulcanized with X-LINKER 1 (1.2 g) and CATALYST (0.06 g), the torque increasing from about 1000 to 1500 m-g during the vulcanization. After compression molding, the product had a tensile of 5.6 MPa and elongation of 108%.

For comparative purposes, a similar system without the PTFE was prepared. FC 1 (37 g) was modified with AGENT 2 (0.4 g) and PEROXIDE (0.1 g) at 175–185° C. BASE 1 (37 g) was added and mixed for about 7 min. The silicone was then vulcanized with X-LINKER 1 (1.2 g) and CATALYST (0.07 g). Torque increased from about 600 m-g to about 1100 m-g during vulcanization. After compression molding, the material had a tensile strength of 4.3 MPa and elongation of 66%, thus illustrating the benefit of incorporating polytetrafluoroethylene powder.

Example 42

FC 1 (56 g) was modified with AGENT 8 (0.8 g) and PEROXIDE (0.09 g) at 175–185° C. using Sigma blades at 100 rpm. BASE 2 (23.5 g) was added 6 min after the addition of PEROXIDE. After mixing for 5 min, X-LINKER (1.3 g) was added slowly to avoid over lubrication and sticking to the blades. After 7 min, CATALYST (0.07 g) was added and the torque rapidly increased from about 1000 m-g to 2250 m-g. A sample of the product was molded and tested to give an ultimate tensile strength of 17.7 MPa and elongation of 360%.

(Comparative) Example XIX

A masterbatch of 42 g of PDMS 1 and 28 g of MIN-U-SIL™ (5 micron) was prepared by mixing at 190° C. for 9 min. The latter filler is described as a non-reinforcing ground silica having a top particle size of 5 microns and an average particle size of about 1.4 microns and marketed by U.S. Silica Co., Berkeley Springs, W. Va. FC 1 (56 g) was modified with AGENT 1 (0.65 g) and PEROXIDE (0.1 g) at 185° C. An aliquot (23.5 g) of the above masterbatch was added and mixed about 10 min. The silicone phase was then vulcanized with X-LINKER 1 (1.2 g) and CATALYST (0.07 g) as torque increased from about 400 m-g to about 1300 m-g. A sample was compression molded to give a tensile strength of 5.8 MPa and elongation of 15%. These properties are seen to be considerably worse than a comparable TPSiV prepared from a base made with a reinforcing silica filler (e.g., Example 5).

Example 43

FC 5 (31.5 g) was melted in a mixer equipped with roller blades at 250° C. in a nitrogen atmosphere and AGENT 1 (0.1 g) was added. Then PEROXIDE 1 (0.08 g) was added and the material mixed at 250° C. for 15 min. BASE 2 (13.5 g) was added and mixed for about 2 min when X-LINKER 1 (0.7 g) was added over a 10 min period. CATALYST (0.07 g) was added and the torque increased from 500 m-g to 1500 m-g. Product was removed from the mixer and compression molded at 270° C. for 2 min to give a material with Shore D durometer 42, ultimate tensile strength 23.0 MPa and elongation 60%.

(Comparative) Example XX

FC5 (31.5 g) was melted in a mixer equipped with roller blades at 250° C. in a nitrogen atmosphere. BASE 2 (13.5 g) was added and mixed for about 3 min when X-LINKER 1 (0.7 g) was added over a 3 min period. CATALYST (0.07 g) was added and the torque slowly increased from 450 m-g to 550 m-g. After 4 min, additional CATALYST (0.07 g) was added and the torque slowly increased to 900 m-g. This product based on an unmodified resin was removed from the mixer and compression molded at 270° C. for 2 min to give a material with Shore D durometer 50, ultimate tensile strength 17.0 MPa and elongation of only 11%.

Example 44

FC 1 (56 g) was melted in the mixer at 180° C. for 5 min. AGENT 6 (0.4 g) was added and then PEROXIDE (0.1 g) was added. After 4 min, BASE 2 (23.5 g) was added. After 5 min, CATALYST (0.07 g) was added and mixed for 4 min and X-LINKER 1 (1.2 g) was added. Torque increased as soon as the initial portion of X-LINKER 1 was added and continued to rise as X-LINKER 1 was added (from 750 m-g to 2,000 m-g). The product had an ultimate tensile strength of 10.3 MPa and elongation of 176%. These properties are essentially equal to those obtained in Example 21 of Table 5, the latter being an identical composition wherein X-LINKER 1 was mixed into the blend before CATALYST was added.

That which is claimed is:

1. A method for preparing a thermoplastic elastomer, said method comprising:
   (I) reacting
     (A) a fluorocarbon resin with
     (B) a grafting agent selected from the group consisting of
       (B') an organic compound which contains at least 2 olefinic groups,
       (B'') a organopolysiloxane having a viscosity of less than 5,000 mPa-s at 25° C. and containing at least 2 olefin groups and
       (B''') a silane having at least one olefinic group and at least one silicon-bonded moiety selected from the group consisting of a hydrolyzable group and a hydroxyl group, in the presence of
     (C) a radical initiator,
   to prepare a modified fluorocarbon resin;
   (II) mixing said modified fluorocarbon resin with
     (D) a silicone base comprising
       (D') a diorganopolysiloxane having a plasticity of at least 30 and having an average of at least 2 alkenyl radicals in its molecule and
       (D'') 10 to 200 parts by weight of a reinforcing filler for each 100 parts by weight of said diorganopolysiloxane (D'),
     (E) an organohydrido silicon compound which contains an average of at least 2-silicon-bonded hydrogen groups in its molecule, and (F) a hydrosilation catalyst,
components (E) and (F) being present in an amount sufficient to cure said diorganopolysiloxane; and (III) dynamically curing said diorganopolysiloxane, wherein the amount of said diorganopolysiloxane base (B) used is such that at least one property of said thermoplastic elastomer selected from tensile strength or elongation is at least 25% greater than the respective property for a corresponding composition wherein said fluorocarbon resin is not modified,
with the proviso that said thermoplastic elastomer has an elongation of at least 25%.

2. The method according to claim 1, wherein said fluorocarbon resin is selected from the group consisting of poly(vinylidene difluoride) homopolymer, a copolymer of vinylidene difluoride with a fluoroolefin, a copolymer of chlorotrifluoroethylene with ethylene, a copolymer of tetrafluoroethylene with ethylene and a copolymer of hexafluoropropene with ethylene.

3. The method according to claim 2, wherein said diorganopolysiloxane (D') is a polydimethylsiloxane containing at least 85 mole percent dimethylsiloxane units and said filler (D") is a fumed silica.

4. The method according to claim 3, wherein said organohydrido silicon component (E) contains 0.5 to 1.7 weight percent hydrogen bonded to silicon, has a viscosity of 2 to 500 mPa-s at 25° C. and is selected from the group consisting of a polymer consisting essentially of methylhydridosiloxane units and a copolymer consisting essentially of dimethylsiloxane units and methylhydridosiloxane units.

5. The method according to claim 4, wherein said initiator (C) is selected from the group consisting of dicumyl peroxide and cumene hydroperoxide and said catalyst (F) is a neutralized complex of platinous chloride and divinyltetramethyldisiloxane.

6. The method according to claim 3, wherein said fluorocarbon resin is selected from the group consisting of poly(vinylidene difluoride) homopolymer, a copolymer of vinylidene difluoride with chlorotrifluoroethylene, a copolymer of vinylidene difluoride with tetrafluoroethylene, a copolymer of vinylidene difluoride with hexafluoropropene a copolymer of chlorotrifluoroethylene with ethylene, a copolymer of tetrafluoroethylene with ethylene and a copolymer of hexafluoropropene with ethylene.

7. The method according to claim 6, wherein a polytetrafluoroethylene powder is added during said mixing step (II).

8. The method according to claim 1, wherein said diorganopolysiloxane (D') is a polydimethylsiloxane containing at least 85 mole percent dimethylsiloxane units and said filler (D") is a fumed silica.

9. The method according to claim 1, wherein said fluorocarbon resin constitutes 40 to 95 weight percent of the total of said components (A) through (F).

10. The method according to claim 1, wherein the mixing and curing steps are conducted in a twin-screw extruder.

11. The method according to claim 1, wherein said grafting agent (B) is selected from the group consisting of diallyphthalate, triallyl isocyanurate, 2,4,6-triallyloxy-1,3,5-triazine, triallyl trimesate, 1,5-hexadiene, 1,7-octadiene, 2,2'-diallylbisphenol A, N,N'-diallyl tartardiamide, diallylurea, divinyltetramethyldisiloxane, cyclotrimethyltrivinyltrisiloxane, cyclotetramethyltetravinyltetrasiloxane, hydroxy end-blocked polymethylvinylsiloxane, hydroxy terminated polymethylvinylsiloxane-co-polydimethylsiloxane, dimethylvinylsiloxy terminated polydimethylsiloxane, tetrakis(dimethylvinylsiloxy)silane, tris(dimethylvinylsiloxy)phenylsilane, vinyltriethoxysilane, vinyltrimethoxysilane, hexenyltriethoxysilane, hexenyltrimethoxy, methylvinyldisilanol, octenyltriethoxysilane, vinyltriacetoxysilane, vinyltris(2-ethoxyethoxy)silane, methylvinylbis(N-methylacetamido)silane and methylvinyldisilanol.

12. A thermoplastic elastomer prepared according to the method of claim 1.

13. A thermoplastic elastomer prepared according to the method of claim 2.

14. A thermoplastic elastomer prepared according to the method of claim 3.

15. A thermoplastic elastomer prepared according to the method of claim 4.

16. A thermoplastic elastomer prepared according to the method of claim 5.

17. A thermoplastic elastomer prepared according to the method of claim 6.

18. A thermoplastic elastomer prepared according to the method of claim 7.

19. A thermoplastic elastomer prepared according to the method of claim 8.

20. A thermoplastic elastomer prepared according to the method of claim 9.

21. A thermoplastic elastomer prepared according to the method of claim 10.

22. A thermoplastic elastomer prepared according to the method of claim 11.

* * * * *